(12) United States Patent
Tamboise et al.

(10) Patent No.: US 9,274,238 B2
(45) Date of Patent: Mar. 1, 2016

(54) RELIABLE BROADCAST DELIVERY OF COMMUNICATIONS IN LAND-BASED SEISMIC SURVEYING

(75) Inventors: Guillaume J. D. Tamboise, Oslo (NO); Christin Rendalen, Drammen (NO); Tristan Hollande, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 922 days.

(21) Appl. No.: 12/267,581

(22) Filed: Nov. 8, 2008

(65) Prior Publication Data

US 2010/0118656 A1    May 13, 2010

(51) Int. Cl.
| | |
|---|---|
| *G01V 1/00* | (2006.01) |
| *G01V 1/22* | (2006.01) |
| *G01V 1/04* | (2006.01) |
| *G01V 1/06* | (2006.01) |
| *G01V 1/26* | (2006.01) |
| *H04L 1/18* | (2006.01) |
| *H04L 1/00* | (2006.01) |
| *H04L 1/16* | (2006.01) |

(52) U.S. Cl.
CPC .. *G01V 1/22* (2013.01); *G01V 1/04* (2013.01); *G01V 1/06* (2013.01); *G01V 1/26* (2013.01); *H04L 1/1867* (2013.01); *H04L 1/0002* (2013.01); *H04L 1/1607* (2013.01); *H04L 2001/0093* (2013.01); *H04L 2001/0094* (2013.01); *H04L 2001/0097* (2013.01)

(58) Field of Classification Search
CPC ............ G01V 1/04; G01V 1/22; G01V 1/26; H04L 1/0002
USPC ................................................ 367/38, 76–78
See application file for complete search history.

(56) References Cited

U.S. PATENT DOCUMENTS

| | | |
|---|---|---|
| 5,668,951 A | 9/1997 | Jain et al. |
| 6,249,530 B1 | 6/2001 | Blanco et al. |
| 6,505,253 B1 | 1/2003 | Chiu et al. |
| 6,526,022 B1 | 2/2003 | Chiu et al. |
| 6,904,015 B1 | 6/2005 | Chen et al. |
| 7,035,214 B1 * | 4/2006 | Seddigh et al. ............... 370/231 |
| 7,261,162 B2 * | 8/2007 | Deans et al. .................. 166/336 |
| 2003/0117893 A1 | 6/2003 | Bary |
| 2007/0104028 A1 * | 5/2007 | Van Manen et al. ............ 367/38 |
| 2008/0065943 A1 | 3/2008 | Botha |
| 2008/0080310 A1 * | 4/2008 | Eperjesi et al. .................. 367/77 |
| 2009/0207247 A1 * | 8/2009 | Zampieron et al. ........... 348/143 |

OTHER PUBLICATIONS

PCT Search Report, dated Jun. 21, 2010, Application No. PCT/US2009/063415.
Allman, et al, TCP Congestion Control, http://rfc.dotsrc.org/rfc/rfc2581.html, Apr. 1999.
http://www/iongeo.com/firefly/, ION, 2006.
Park, et al., "Performance evaluation of multiple time scale TCP under self-similar traffic conditions", ACM Transactions on Modeling and Computer Simulation, vol. 10 (2), Apr. 2000, pp. 152-177.
Supplementary European Search Report of European Application No. 09825420.4 dated Jan. 31, 2013: pp. 1-2.
Iliadis, "Performance of TCP Traffic and ATM Feedback Congestion Control Mechanisms," Global Telecommunications Conference, Nov. 1996: 1930-1934.
Final Office Action of Russian Application No. 2011122980 dated Aug. 19, 2013: pp. 1-5.

* cited by examiner

*Primary Examiner* — Krystine Breier

(57) ABSTRACT

A method for use in a land-based seismic survey includes: transmitting a plurality of source control commands to a plurality of seismic sources over a VHF/IP network; and managing congestion on the VHF/IP network while transmitting the source control commands. In other aspects, a program storage medium encoded with instructions that, when executed by a processor, perform such a method and a computer programmed to perform such a method.

18 Claims, 4 Drawing Sheets

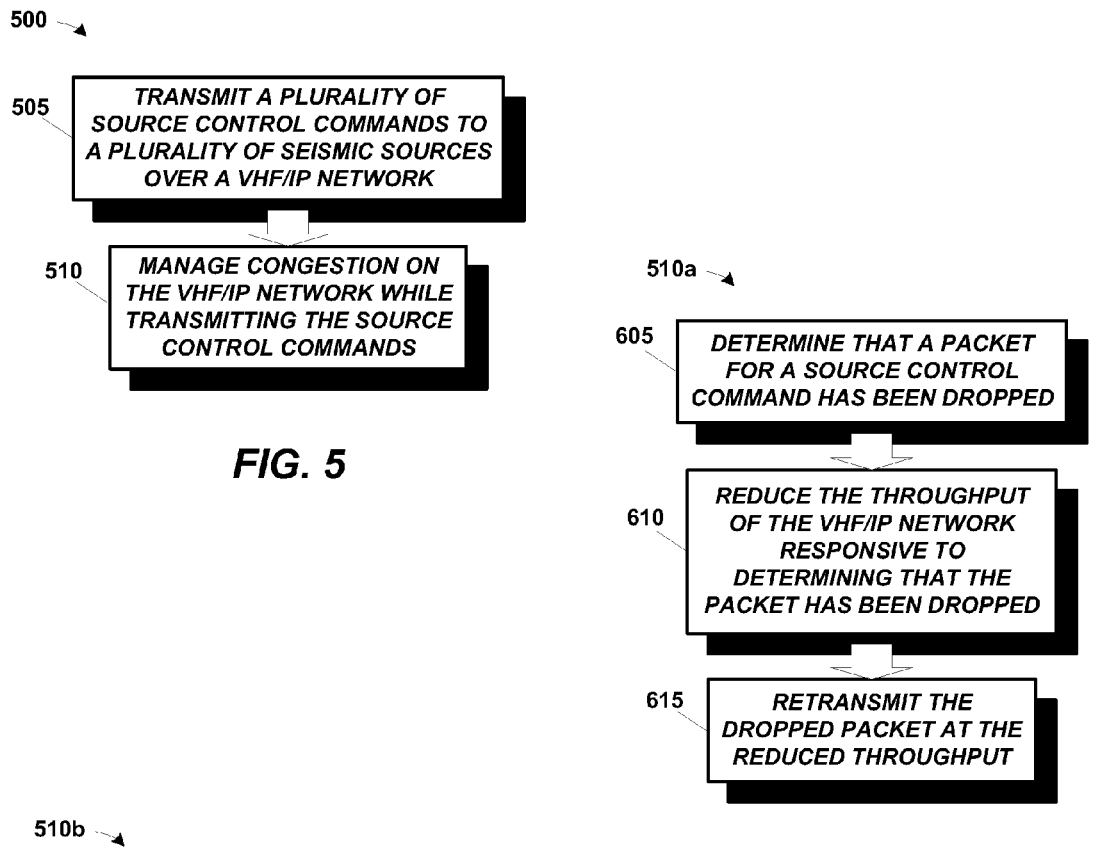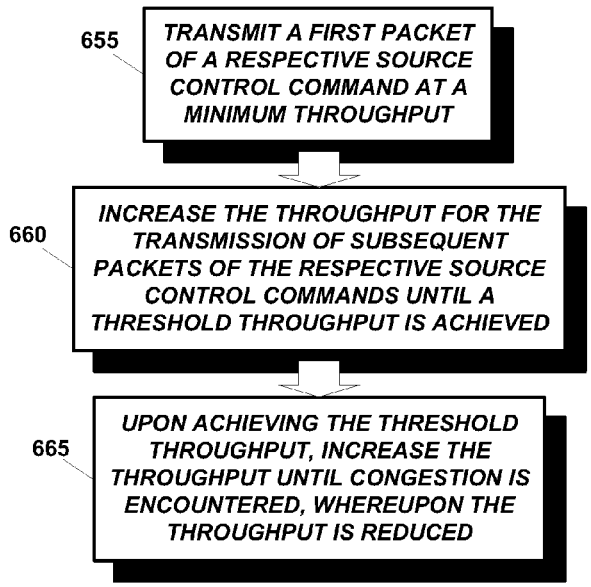
FIG. 5
FIG. 6A
FIG. 6B

RELIABLE BROADCAST DELIVERY OF COMMUNICATIONS IN LAND-BASED SEISMIC SURVEYING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention pertains to land-based seismic surveying and, in particular, to reliable broadcast delivery of communications in land-based seismic surveys.

2. Description of the Related Art

This section of this document is intended to introduce various aspects of the art that may be related to various aspects of the present invention described and/or claimed below. This section provides background information to facilitate a better understanding of the various aspects of the present invention. As the section's title implies, this is a discussion of related art. That such art is related in no way implies that it is also prior art. The related art may or may not be prior art. It should therefore be understood that the statements in this section of this document are to be read in this light, and not as admissions of prior art.

Seismic surveying typically involves imparting seismic survey signals into the Earth. Various features in the subterranean formations reflect the signals back to the Earth's surface. The reflections are then detected and recorded. Analysis of the recorded reflections can then yield indications of probable presence (or absence) of hydrocarbon deposits and their locations.

Seismic surveys are usually conducted over very large areas. Current analytical techniques are predicated on obtaining a sufficient sampling of the area under survey. This sampling includes both the number and location of data points. This consideration has a number of consequences for the survey in both design and execution. For example, the number and placement of both the seismic sources that generate seismic signals and the seismic receivers that detect the reflections are carefully considered and distributed across survey area.

Some surveys might employ several tens of seismic sources across several square kilometers. The analytical techniques mentioned above are usually also predicated on being able to distinguish which reflections are generated from which of the many seismic survey signals used in the survey. This, in turn, means that the seismic survey signals need to be distinguishable from one another.

One common technique for generating distinguishable seismic survey signals is to stagger the firing of the sources. The firing is then managed from some central point, typically a recording truck. The central source system sends commands to the seismic sources to fire them in a certain sequence and at certain times. This sequence and timing is predetermined and is not random.

However, this approach adds a logistical burden to the survey. The seismic sources are usually spread apart quite some distance, and typically at a goodly distance from the central source system. Running physical signal lines from the central source system to the seismic sources can be very difficult and costly both because of the time needed to run them and because of the logistics involved in transporting, deploying, and retrieving them. Some attempts have been made at implementing wireless surveys, but they encounter difficulties with reliability, bandwidth, latency, and/or reliability with respect to communications between the central source system and the seismic sources.

The present invention is directed to resolving, or at least reducing, one or all of the problems mentioned above.

SUMMARY OF THE INVENTION

In its various aspects, implementations, and embodiments, the present invention includes a method for use in a land-based seismic survey. The method comprises: transmitting a plurality of source control commands to a plurality of seismic sources over a VHF/IP network; and managing congestion on the VHF/IP network while transmitting the source control commands. In other aspects, the invention includes a program storage medium encoded with instructions that, when executed by a processor, perform such a method and a computer programmed to perform such a method.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which:

FIG. 5 charts one embodiment of a method practiced in accordance with one particular aspect of the present invention;

FIG. 6A-FIG. 6B chart the management of congestion in the method of FIG. 5; and

Figure 1:
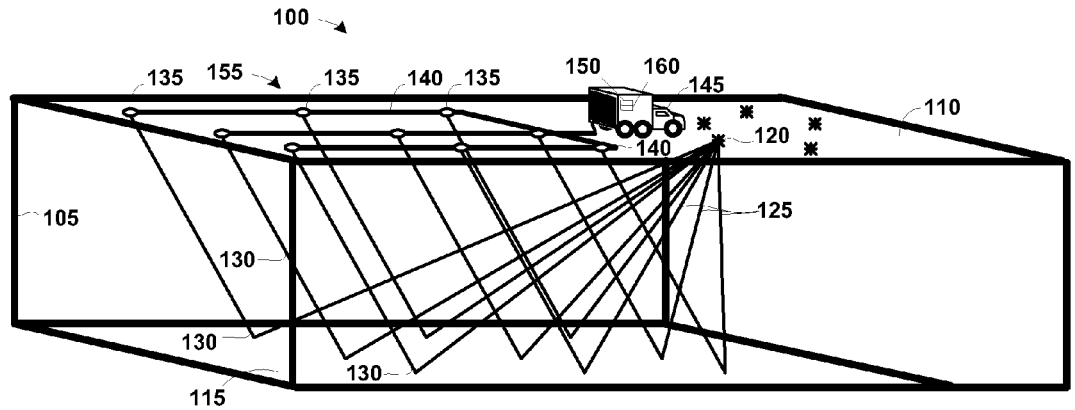
FIG. 1 depicts, in a conceptualized fashion, an exemplary land-based survey of a subterranean geological formation.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

During some seismic surveys, it is desirable to wirelessly send information from a seismic recording truck to a number of seismic sources over long distances (kilometers). Because of the long distance requirement and the geographical areas involved, Very High Frequency ("VHF") communications are being used. VHF communications offer fairly high-latency (100 ms) low-bandwidth (20 kbps), scarcely buffered and occasionally fairly-high-loss (up to several percents) data networks. Most of the traffic being sent is real-time and important to operations. The throughput available on the VHF network depends on a set of unpredictable and changing environmental and regulatory factors. Exemplary factors include, for example, channel bandwidth allocated to the VHF network and usage of VHF repeaters. The radio frequency environment conditions the strength of the signal as received by the recording truck and the vibrators. In this context, exemplary environmental factors may include distance between the vibrators and the recording truck, interferences, reflections, multiple paths.

The present invention uses the Internet Protocol ("IP") as a network protocol in the VHF network. More particularly, the present invention estimates and adjusts in real-time the optimal throughput at which the recording truck can send its data. In one particular embodiment, the estimation is based on various communications in the VHF/IP network such as negative acknowledgements ("NACK") received from the vibrators and transmission phase of the data transfer.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 depicts, in a conceptualized fashion, a land-based survey 100 of a subterranean geological formation 105. The geological formation 105 includes, in the illustrated embodiment, the surface 110 and a reflector 115. Those skilled in the art having the benefit of this disclosure will appreciate that this illustration is highly idealized. For instance, most surveys will be of formations deep beneath the surface. Geological formations under survey can also be much more complex. The formations will typically include multiple reflectors, some of which will include dipping events, and will generate multiple reflections (including wave conversion). FIG. 1 omits these additional layers of complexity for the sake of clarity and so as not to obscure the present invention.

The geological survey 100 includes a plurality of seismic sources 120 (only one indicated) that impart seismic survey signals 125 (only three indicated) into the geological formation 105. The seismic sources 120 may be vibroseis sources or impulse sources, such as explosives or air guns, as are known in the art. The seismic sources 120 may be positioned in accordance with conventional practice. Those in the art will recognize that the number and positioning of the seismic sources 120 will be implementation specific, depending on the specifications for the given survey.

The seismic survey signals 125 are reflected by the reflector 115, and the reflections 130 (only three indicated) are received by a plurality of seismic receivers 135 (only three indicated). Those in the art will also appreciate that the reflection mechanism shown in FIG. 1 is also highly idealized and omits such common occurrences as wave splitting, partial reflection, multiple reflection, wave conversion, etc. The seismic receivers 135 generate electrical signals (not shown) representative of the received reflections 130. The electrical signals are embedded with information regarding the geological formation 105. The electrical signals are transmitted over the lines 140 (not all indicated) to a recording truck 145, where they are captured as seismic data.

The data collection unit 150 is centrally located on the recording truck 145. However, as will be appreciated by those skilled in the art, various portions of the data collection unit 150 may be distributed in whole or in part, e.g., across the seismic recording array 155, in alternative embodiments. The data collection unit 150 receives the electrical signals from the seismic sensors 135 and either stores it or wirelessly transmits it to a central processing facility (not shown).

Figure 2A:
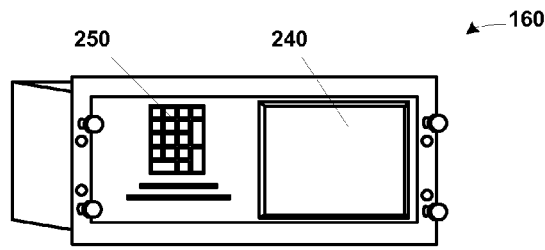
FIG. 2A-FIG. 2B show selected portions of the hardware and software architecture of a computing apparatus such as may be employed in some aspects of the present invention.
Figure 2B:
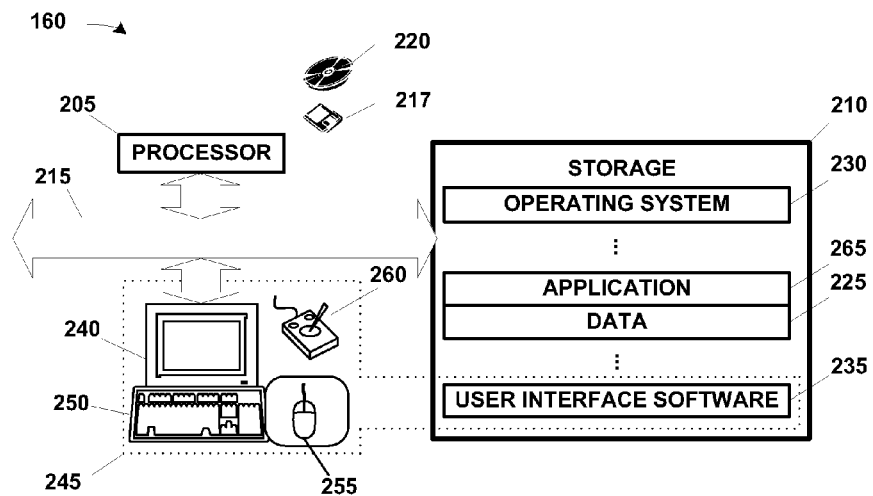

The recording truck 145 also houses a central source system 160. The central source system 160 is a rack-mounted computing apparatus that manages the firing of the seismic sources 120 in accordance with the present invention. FIG. 2A-FIG. 2B show selected portions of the hardware and software architecture of a central source system 160 such as may be employed in some aspects of the present invention. In the illustrated embodiment, the central source system 160 is implemented in a UNIX server, but the invention is not so limited. Any suitable computing apparatus known to the art may be employed. Those in the art will appreciate that significant variation in implementation across various embodiments may militate in favor of certain types of computing apparatuses—that is, the central source system 160 will be implementation specific.

The central source system 160 includes a processor 205 communicating with storage 210 over a bus system 215. The storage 210 may include a hard disk and/or random access memory ("RAM") and/or removable storage such as a floppy magnetic disk 217 and an optical disk 220. The storage 210 is encoded with a data 225. The data 225 is acquired and analyzed as discussed further below to evaluate the performance of a VHF radio network including the seismic sensors 120 and the central source system 160. The data 225 will typically include a queue of packets awaiting transmission and data received from the sources 120, both as described further below. These types of data will usually be stored in separate data structures and not intermingled.

The storage 210 is also encoded with an operating system 230, user interface software 235, and an application 265. The user interface software 235, in conjunction with a display 240, implements a user interface 245. The user interface 245 may include peripheral I/O devices such as a keypad or keyboard 250, a mouse 255, or a joystick 260. The processor 205 runs under the control of the operating system 230, which may be practically any operating system known to the art. The application 265 is invoked by the operating system 230 upon power up, reset, or both, depending on the implementation of the operating system 230. The application 265, when invoked, performs the method of the present invention. The user may alternatively invoke the application in conventional fashion through the user interface 245.

Figure 3:
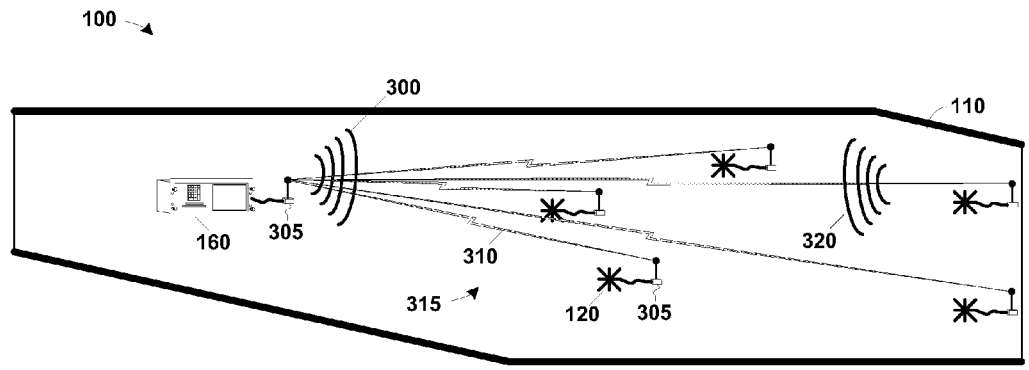
FIG. 3 depicts selected parts of the survey of FIG. 1 relevant to certain aspects of the present invention.

As is better shown in FIG. 3, the central source system 160 communicates wirelessly with the seismic sources 120 (only one indicated) by broadcasting signals 300. The signals 300 are Very High Frequency/Internet Protocol ("VHF/IP") signals and transmit source control commands. To this end, each of the central source system 160 and the seismic sources 120 are equipped with VHF/IP radios 305 (only two indicated). Such VHF/IP radios are commercially available off the shelf and any suitable VHF/IP may be used. Thus, through the broadcast and receipt of signals such as the signals 300 using the VHF/IP radios 305, the central source system 160 establishes a wireless communications link 310 (only one indicated) with each of the seismic sources 120. The VHF/IP radios 305 and wireless communications link 310 consequently define a VHF/IP network 315.

The source control commands may be of several "types" defined by their content and the functionality they are intended to impart. For example, one common "type" would be firing commands to the sources 120 telling them when to fire during the survey. But, the invention is not so limited. Other types of signals 300 may include, in various embodiments, plans (GPS locations of the next shot points), group information (defining what seismic source 120 belongs to what group of seismic sources 120), requests for quality control, aborts, sweep configuration, sweep definition, etc.

The VHF/IP radios 305 are two-way radios. In certain aspects of the present invention discussed further below, the seismic sources 120 transmit signals 320 back to the central source system 160. Thus, wireless communications links 310 of the network 315 are two-way links.

As noted above, the signals 300 are VHF/IP signals. In this context, "VHF" is a reference to the widely recognized portion of the radio frequency, electromagnetic spectrum designated as such by the International Telecommunication Union ("ITU") and commonly referred to simply as "VHF". Thus, the frequency of the signals 300 ranges from approximately 30 MHz to approximately 300 MHz.

The format of the signals 300 is defined by several well known protocols. "IP" is a reference to the commonly used "Internet Protocol". The signals 300 contain information that is broken up into "packets" that are separately transmitted. IP specifies the format and addressing of these packets. A variation on a separate, transport protocol called "User Datagram Protocol" ("UDP") determines how the packets are transmitted; UDP packets are sometimes called "datagrams". UDP, in its standard, well known formulation, is a connectionless protocol commonly used for broadcasting packets over networks. Each source control command is therefore separated into a plurality of packets, each of which is assigned a sequence number for transmission to the sources 120.

Straightforward implementations of UDP/IP provide no error recovery services, which is highly undesirable. An alternative transmission protocol known as "Transport Control Protocol" ("TCP") addresses the issues in a better fashion and implements well proven congestion avoidance mechanisms. However, it is unsuitable for this type of application because it (1) is based solely on positive acknowledgements that cause additional traffic, which is inappropriate on low bandwidth networks, and (2) does not have a notion of broadcast.

The present invention therefore uses the stateless UDP protocol and adapts and incorporates some of the TCP slow start and congestion avoidance mechanisms. In order to keep a notion of state, each packet for a given source control command coming from the central source system 160 is assigned a sequence number. That is, as mentioned above, a source control command is broken into a set of packets and each packet is assigned a sequence number. The packets are then broadcast over the VHF/IP network 315, shown in FIG. 3.

The seismic sources 120 receive the transmitted packets. Sometimes, whether for environmental or operational reasons, a seismic source 120 may not receive all the packets for a given source control command. If a seismic source 120 is missing one of the packets, it transmits a "negative acknowledgement." A negative acknowledgement is a request for a message with one or more sequence number(s) that a seismic source 120 sends whenever it realizes that it missed one or more packet(s) with the sequence number(s). Or, in some circumstances, the seismic sources 120 may transmit an "acknowledgement" ("ACK") signal that it has successfully received a packet. In these circumstances, the central source system 160 will realize that a seismic source 120 has not received a packet upon failure to receive an acknowledgement within a given, predetermined period of time.

In the illustrated embodiment, IP packets are classified in two classes. One of the classes is made of the non-real-time packets; they are negatively acknowledged and cause an increase in the sequence number. The other class is made of real-time packets; they are acknowledged and do not cause an increase in the sequence number. The real-time packets do not contribute to increasing the throughput—only the non-real-time packets do. Real-time packets can only contribute to decreasing the throughput; they do so when they are missing an acknowledgment.

In the illustrated embodiment, the seismic source 120 transmits the negative acknowledgement whenever it receives a message with a higher-than-expected sequence number. Any given negative acknowledgement may actually contain more than one sequence number if the seismic source 120 realizes that it has missed more than one packet. The central source system 160 will then retransmit the missing packet(s). Note that, in this particular embodiment, each missing packet is retransmitted only once no matter how many of the seismic sources 120 transmit a negative acknowledgement regarding that datagram. Also, the seismic sources 120 transmit back to the central source system 160 more than the negative acknowledgements and acknowledgements discussed above. The seismic sources 120 also send feedback on command and control, quality control and other types of performance information.

Thus, in the present invention, more than just firing commands are communicated between the central source system 160 and the seismic sources 120. This level of communication is much higher than is seen in conventional seismic surveys and will generally lead to congestion on the VHF/IP network 315. Furthermore, the VHF/IP network 315 used in the present invention implements "collision avoidance" of signals. As a result, rather than risking collisions, the VHF/IP network 315 buffers the packets it needs to send if it is detecting that the airwaves are busy. When too many packets are buffered, the VHF/IP network 315, or at least a part of it, is congested.

Figure 4:
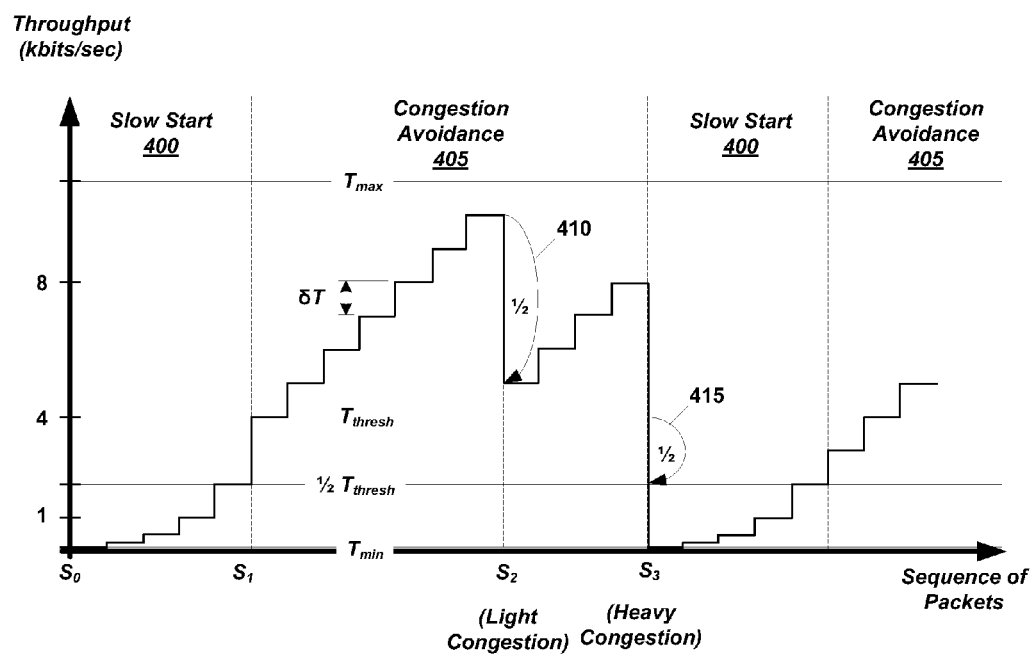
FIG. 4 graphs throughput T (kbits/sec) of sequenced packets in source control commands as a function of the sequence of those packets in one particular exemplary embodiment.

The present invention therefore manages congestion in addition to transmitting information over a VHF/IP network. FIG. 4 graphs throughput T (kbits/sec) of sequenced packets in source control commands as a function of the sequence S of those packets in one particular exemplary embodiment. The reliable broadcast delivery stack starts at $S_0$ by sending packets at an original (low) throughput $T_{min}$. For every packet sent at the specified throughput, throughput is doubled until it reaches a throughput of $T_{thresh}$ at $S_1$. For present purposes, this may be referred to as the "slow start" phase 400.

Once throughput reaches $T_{thresh}$ at $S_1$, it is increased by a predetermined δT as each subsequent packet is sent. In this phase, the possibility of congestion presents itself, and so this may be referred to as a "congestion avoidance" phase 405. The illustrated embodiment breaks congestion into "light" and "heavy" congestion. Whether the level of congestion is considered "light" or "heavy" is based on the content of the queue of missed packets to be retransmitted.

In this particular instance, a bit of light congestion is experienced at $S_2$. This particular embodiment considers "light" congestion to arise when a seismic source 120, shown best in FIG. 3, has a queue, or buffer, of missed packets that contains at least one packet and at most a certain number of packets. For example, in the illustrated embodiment, "light congestion" was considered to be three or fewer missed packets in the queue. However, other numbers, such as five, may be used in alternative embodiments. The central source system 160 stays in congestion avoidance mode but reduces its throughput in half as indicated by the graphic 410.

Heavy congestion, at $S_3$, arises when the number of missed messages exceeds the certain number of packets. That would be three in the illustrated embodiment. In this instance, $T_{thresh}$ is divided by two as indicated by the graphic 415 and the threshold $T_{thresh}$ gets back to $T_{min}$. In all cases, throughput does not exceed $T_{max}$.

Although not illustrated in FIG. 4, the illustrated embodiment provides a mechanism by which $T_{thresh}$ may be increased when network conditions improve significantly. When the throughput T reaches $T_{thresh}*2$, $T_{thresh}$ is increased by a certain factor. In the illustrated embodiment, the factor is 50%.

Figure 7:
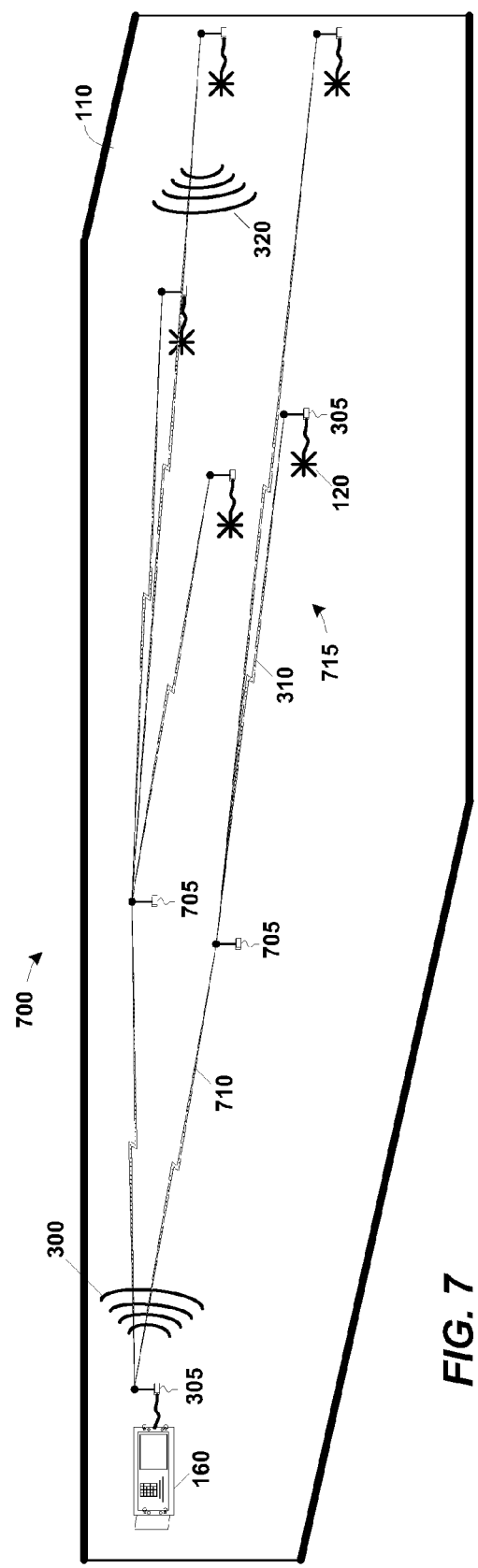
FIG. 7 depicts, in a conceptualized fashion, a second exemplary land-based survey of a subterranean geological formation.

As noted above, the throughput available on a VHF network depends on a set of unpredictable and changing environmental and regulatory factors that will vary by implementation. Those in the art will therefore appreciate that the precise values for $T_{min}$, $T_{thresh}$, δT, and $T_{max}$ will be implementation specific. In the embodiment of FIG. 4, $T_{thresh}$=4 kb/sec, $T_{min}$=125 bits/sec, $T_{max}$=10 kbits/sec, and δT (throughput increase in congestion avoidance phase)=1 kbit/sec. This particular embodiment employed 40 sources and a number of repeaters as discussed in connection with FIG. 7 below. In a second embodiment, $T_{thresh}$=550 bytes/sec, $T_{min}$=100 bytes/sec, $T_{max}$=850 bytes/sec, and δT (throughput increase in congestion avoidance phase)=55 bytes/sec.

The present invention uses known IP Quality of Service ("QoS") mechanisms on the queue of packets in the central source system, in order to increase latency and reliability of the real-time traffic. While these mechanisms are well known, their use in this manner is not. However, they facilitate the reliable broadcast delivery employed herein. The particular embodiment illustrated herein uses a priority queue, but many other queuing mechanisms could be used.

The transmission of the source control commands and the congestion management described above are performed in the illustrated embodiment by the application 265, shown in FIG. 2. The nature of the application 265 is not material to the practice of the invention. For example, in some alternative embodiments, the software component may instead be a utility or a script. Similarly, in the illustrated embodiment, the application 265 is currently coded in Java, but any programming language that can interface with an IP network would do. The situs of the functionality is also not limiting. There is no requirement, for example, for the central source system 160 and the data collection unit 150 to comprise separate computing apparatuses. These and other, similar, aspects of the illustrated embodiment are implementation specific and the invention admits wide variation in them.

Note that some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Thus, referring now to FIG. 2B and FIG. 5, in the illustrated embodiment, the application 265 performs a method (at 500) for use in a land-based seismic survey, comprising: transmitting (at 505) a plurality of source control commands to a plurality of seismic sources over a VHF/IP network; and managing (at 510) congestion on the VHF/IP network while transmitting the source control commands.

In this particular embodiment, in the method (at 500), broadcasting the source control commands includes retransmitting dropped packets, and/or transmitting the source control commands using a User Datagram Protocol.

The management (at 510) in the illustrated method (at 500) can be described from the perspective of what happens to packets, as shown in FIG. 6A, and from the perspective of what happens to throughput, as shown in FIG. 6B. From a packet perspective, the management (at 510a) of congestion, includes determining (at 605) that a packet for a source control command has been dropped; reducing (at 610) the throughput of the VHF/IP network responsive to determining that the packet has been dropped; and retransmitting at (615) the dropped packet at the reduced throughput. From a throughput perspective, the management (at 510*b*) of congestion includes: transmitting (at 655) a first packet of a respective source control command at a minimum throughput; increasing (at 660) the throughput for the transmission of subsequent packets of the respective source control commands until a threshold throughput is achieved; and upon achieving the threshold throughput, increasing (at 665) the throughput until congestion is encountered, whereupon the throughput is reduced.

The invention admits wide variation on the VHF/IP network 315, show in FIG. 3. One significant variation 700 shown in FIG. 7 will be the use of "repeaters" 705. The repeaters 705 permit the placement of the sources 120 and their respective VHF/IP radios 305 further away from the central source system 160. The repeaters 705 may also be implemented in the same VHF/IP radios as the VHF/IP radios 305, but any suitable VHF/IP radio known to the art may be used. In such networks 715, the VHF/IP radios 305 receive and transmit the signals 300, 320 to and from the central source system 160 through the repeaters 705. Other variations may include the number and placement of the sources 120. Still other variations will become apparent to those skilled in the art having the benefit of this disclosure.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer-implemented method for use in a land-based seismic survey, comprising:
    transmitting a plurality of packets to a plurality of seismic sources for a seismic survey over a VHF/IP network;
    receiving a negative acknowledgement that one or more of the packets were dropped; and
    managing congestion on the VHF/IP network while transmitting the plurality of packets by adjusting throughput on the VHF/IP network in response to receiving the negative acknowledgement, and
    wherein transmitting the plurality of packets over the VHF/IP network comprises broadcasting the plurality of packets on VHF using a stateless UDP protocol.

2. The computer-implemented method of claim 1, wherein transmitting the plurality of packets includes retransmitting dropped packets.

3. The computer-implemented method of claim 1, wherein managing congestion by adjusting throughput includes:
    determining that a packet for a source control command has been dropped;
    reducing the throughput of the VHF/IP network responsive to determining that the packet has been dropped; and
    retransmitting the dropped packet at the reduced throughput.

4. The computer-implemented method of claim 1, wherein the negative acknowledgement is received from one of the seismic sources.

5. The computer-implemented method of claim 3, wherein reducing the throughput includes:
    ascertaining the position of the dropped packet in the sequence of packets for a respective source control command relative to the next packet to be transmitted; and
    reducing the throughput depending on the ascertained relative position of the dropped packet.

6. The computer-implemented method of claim 1, wherein managing the congestion by adjusting throughput includes:
    transmitting a first packet of a respective source control command at a minimum throughput;
    increasing the throughput for the transmission of subsequent packets of respective source control commands until a threshold throughput is achieved;
    upon achieving the threshold throughput, increasing the throughput until congestion is encountered, whereupon the throughput is reduced.

7. The computer-implemented method of claim 6, wherein the throughput is increased at a first rate before achieving the threshold throughput and at a second rate upon achieving the threshold throughput.

8. The computer-implemented method of claim 6, wherein the throughput is increased by doubling it until the threshold throughput is achieved.

9. The computer-implemented method of claim 6, wherein the throughput is reduced by half upon encountering light congestion.

10. The computer-implemented method of claim 6, wherein the throughput is reduced to one half the threshold throughput upon encountering heavy congestion.

11. A computer-readable program storage medium encoded with a plurality of instructions that, when executed by a processor, performs a method for use in a land-based seismic survey, the method comprising:
    transmitting a plurality of packets to a plurality of seismic sources for a seismic survey over a VHF/IP network;
    receiving a negative acknowledgment that one or more of the packets were dropped; and
    managing congestion on the VHF/IP network while transmitting the source control commands by adjusting throughput on the VHF/IP network in response to receiving the negative acknowledgement, and
    wherein transmitting the plurality of packets over the VHF/IP network comprises broadcasting the plurality of packets on VHF using a stateless UDP protocol.

12. The computer-readable program storage medium of claim 11, wherein transmitting the plurality of packets includes retransmitting dropped packets.

13. The computer-readable program storage medium of claim 11, wherein managing congestion by adjusting throughput includes:
    determining that a packet for a source control command has been dropped;
    reducing the throughput of the VHF/IP network responsive to determining that the packet has been dropped; and
    retransmitting the dropped packet at the reduced throughput.

14. The computer-readable program storage medium of claim 11, wherein managing congestion by adjusting throughput includes:
    transmitting a first packet of a respective source control command at a minimum throughput;
    increasing the throughput for the transmission of subsequent packets of respective source control commands until a threshold throughput is achieved;

upon achieving the threshold throughput, increasing the throughput until congestion is encountered, whereupon the throughput is reduced.

15. A computer-implemented central source system for use in a land-based seismic survey, comprising:
   a processor;
   a bus system;
   a storage communicating with the processor over the bus system; and
   a software component residing on the storage that, when invoked by the processor over the bus system, performs a method, comprising:
      transmitting a plurality of packets to a plurality of seismic sources for a seismic survey over a VHF/IP network;
      receiving a negative acknowledgement that one or more of the packets were dropped; and
      managing congestion on the VHF/IP network while transmitting the plurality of packets by adjusting throughput on the VHF/IP network in response to receiving the negative acknowledgement, and
      wherein transmitting the plurality of packets over the VHF/IP network comprises broadcasting the plurality of packets on VHF using a stateless UDP protocol.

16. The computer-implemented central source system of claim 15, wherein transmitting the plurality of packets includes retransmitting dropped packets.

17. The computer-implemented central source system of claim 15, wherein managing congestion by adjusting throughput includes:
   determining that a packet for a source control command has been dropped;
   reducing the throughput of the VHF/IP network responsive to determining that the packet has been dropped; and
   retransmitting the dropped packet at the reduced throughput.

18. The computer-implemented central source system of claim 15, wherein managing congestion by adjusting throughput includes:
   transmitting a first packet of a respective source control command at a minimum throughput;
   increasing the throughput for the transmission of subsequent packets of the respective source control commands until a threshold throughput is achieved;
   upon achieving the threshold throughput, increasing the throughput until congestion is encountered, whereupon the throughput is reduced.

* * * * *